US011166471B2

(12) United States Patent
Staudenrausch et al.

(10) Patent No.: US 11,166,471 B2
(45) Date of Patent: Nov. 9, 2021

(54) METHOD AND FILLING MACHINE FOR FILLING A FOODSTUFF

(71) Applicant: Albert Handtmann Maschinenfabrik GmbH & Co. KG, Biberach (DE)

(72) Inventors: Martin Staudenrausch, Biberach (DE); Daniel Kloos, Ringschnait (DE)

(73) Assignee: Albert Handtmann Maschinenfabrik GmbH & Co. KG, Biberach (DE)

(*) Notice: Subject to any disclaimer, the term of this patent is extended or adjusted under 35 U.S.C. 154(b) by 864 days.

(21) Appl. No.: 15/695,560

(22) Filed: Sep. 5, 2017

(65) Prior Publication Data

US 2018/0064120 A1 Mar. 8, 2018

(30) Foreign Application Priority Data

Sep. 6, 2016 (DE) .................... 10 2016 216 851.7

(51) Int. Cl.
| | |
|---|---|
| *A22C 11/00* | (2006.01) |
| *A22C 11/02* | (2006.01) |
| *A22C 11/08* | (2006.01) |
| *A22C 5/00* | (2006.01) |
| *B01F 15/00* | (2006.01) |
| *B01F 15/02* | (2006.01) |

(Continued)

(52) U.S. Cl.
CPC ............ *A22C 11/0245* (2013.01); *A22C 5/00* (2013.01); *A22C 11/08* (2013.01); *B01F 15/00376* (2013.01); *B01F 15/00435* (2013.01); *B01F 15/0202* (2013.01); *B01F 2015/0204* (2013.01); *B01F 2215/0014* (2013.01); *B65B 3/04* (2013.01); *B65B 9/10* (2013.01); *B65B 29/00* (2013.01)

(58) Field of Classification Search
CPC ... A22C 11/024; A22C 11/001; A22C 11/008; A22C 11/02; A22C 11/0209; A22C 11/0227; A22C 11/0245; A22C 11/04
USPC ...................... 452/30–32, 35–37, 46–48, 51
See application file for complete search history.

(56) References Cited

U.S. PATENT DOCUMENTS

| | | | |
|---|---|---|---|
| 3,178,066 A | | 4/1965 | Martin |
| 4,347,646 A | * | 9/1982 | Staudenrausch ... A22C 11/0245 452/31 |

(Continued)

FOREIGN PATENT DOCUMENTS

| | | |
|---|---|---|
| CN | 2667898 Y | 1/2005 |
| CN | 101028017 A | 9/2007 |

(Continued)

OTHER PUBLICATIONS

China National Intellectual Property Administration, Office Action and Search Report Issued in Application No. 201710795408.6, dated May 31, 2019, 19 pages.

*Primary Examiner* — Richard T Price, Jr.
(74) *Attorney, Agent, or Firm* — McCoy Russell LLP

(57) ABSTRACT

The present disclosure refers to a filling machine and to a method for filling a foodstuff which comprises at least two components to be mixed, particularly for sausage production. The foodstuff may be filled into a filling hopper of the filling machine and thoroughly mixed with a mixing cam. The mixing cam may be driven via its own drive at different speeds according to a specific speed profile while the foodstuff is conveyed out of the lower portion of the filling hopper via a conveying mechanism and is filled via a filling unit.

15 Claims, 5 Drawing Sheets

(51) Int. Cl.
  *B65B 3/04* (2006.01)
  *B65B 29/00* (2006.01)
  *B65B 9/10* (2006.01)

(56) References Cited

U.S. PATENT DOCUMENTS

| | | | | |
|---|---|---|---|---|
| 4,895,278 | A | | 1/1990 | Mataro |
| 5,334,081 | A | * | 8/1994 | Calderon .................. B01F 7/16 452/198 |
| 5,413,745 | A | * | 5/1995 | Andersson .......... B29B 17/0042 264/68 |
| 5,947,809 | A | * | 9/1999 | Schliesser .......... A22C 11/0245 452/31 |
| 6,123,486 | A | * | 9/2000 | Wilms ............... B65G 53/4616 222/237 |
| 6,309,293 | B1 | | 10/2001 | Zinser et al. |
| 7,771,254 | B2 | * | 8/2010 | Nunn ...................... A22C 5/00 452/30 |
| 2007/0212994 | A1 | | 9/2007 | Maile |
| 2012/0315171 | A1 | | 12/2012 | Staudenrausch |

FOREIGN PATENT DOCUMENTS

| | | |
|---|---|---|
| CN | 101258865 A | 9/2008 |
| EP | 2189063 A1 | 5/2010 |

\* cited by examiner

PRIOR ART

METHOD AND FILLING MACHINE FOR FILLING A FOODSTUFF

CROSS-REFERENCE TO RELATED APPLICATIONS

The present application claims priority to German Patent Application No. 10 2016 216 851.7, entitled "METHOD AND FILLING MACHINE FOR FILLING A FOODSTUFF," filed on Sep. 6, 2016, the entire contents of which are hereby incorporated by reference for all purposes.

TECHNICAL FIELD

The present disclosure refers to a method for filling a foodstuff and to a filling machine.

BACKGROUND AND SUMMARY

So-called filling machines are used for filling foodstuffs, particularly for producing sausages. The foodstuff is here filled into a hopper of the filling machine, transported at the lower end of the hopper by means of a conveying mechanism into a filling unit, e.g. a filling pipe, and for instance ejected into a sausage casing. The foodstuff can also be filled for instance into containers, e.g. trays, etc.

When masses with a solid and a liquid content are filled, the solid constituents may separate or demix from the liquid mass, as is e.g. shown in FIG. 4. The solid constituents may here settle in the lower portion of the hopper or, however, float on the surface of the liquid mass. This depends on the density of the liquid mass and the density and the volume of the solid inclusions or constituents. Hence, as becomes apparent from FIG. 4, serious problems arise in the production of foodstuffs which comprise a predetermined proportion of chunky inclusions in liquid. Such foodstuffs are e.g. sausages with meat and/or vegetable inclusions in aspic, goulash soup or fish salads, etc.

When the solid constituents in the liquid cannot be thoroughly mixed and homogeneously distributed to an adequate degree, the products are mostly produced according to the prior art as follows:

The finished mixture is filled with ladles or similar tools manually into skins, trays, deep-drawing systems, or other containers. The mixing ratio is here controlled visually by the filler, or the inclusions are first filled, separated from the liquid proportion, into the container (by hand or by machine), wherein the inclusions can be controlled with the help of a balance. The container is subsequently filled with the liquid proportion. This can be carried out via a specific volume also by hand or by machine.

Both methods are very complicated, cost-intensive and only a relatively poor hourly output (kg/h) is achieved.

Starting therefrom, it is the object of the present disclosure to provide a method and a filling machine for filling a foodstuff, allowing a reliable, simple and productive filling of foodstuff which comprises at least two components to be mixed.

According to the present disclosure, to fill a foodstuff that comprises at least two components to be mixed, the foodstuff is filled into a filling hopper of a filling machine and thoroughly mixed with a mixing cam. This method is particularly suited for producing sausages. According to the present disclosure the mixing cam has a drive of its own which is driven at different speeds according to a specific speed profile while the foodstuff is conveyed out of the lower portion of the filling hopper via a conveying mechanism and is filled via a filling unit.

This means that while the foodstuff is being filled, the mixing cam is operated at different speeds. The speed profile can here be adapted to a specific foodstuff. A floating or mixing of the solid constituents in the liquid can be achieved by varying the speed during the filling process. Hence, for instance a homogeneous distribution of chunky inclusions in a liquid can be achieved. Since mixing and conveying take place at the same time, the productivity of the method can be improved considerably by comparison with the prior art. Likewise, a filling into sausage casing by means of a filling pipe is possible owing to the method according to the present disclosure.

According to the present disclosure the speed of the mixing cam is independent of the speed of the conveying mechanism during filling. This means that both the mixing cam and the conveying mechanism have separate drives the speed profiles of which are not dependent on one another. Thus, the speed profile of the mixing cam can be exactly adapted to a foodstuff to be processed, namely independently of the conveying capacity and independently of a speed profile of the conveying mechanism.

According to at least one embodiment the mixing cam is continuously operated during filling. It is driven for a specific period continuously at a first speed $v_1$ in a first speed range. The first speed in this speed range may here be constant or may vary in this upper speed range. At intervals this first speed range $v_1$ is reduced to a second speed $v_2$ which is in a second lower speed range, where $v_2 < v_1$. The mixing cam can then be operated at this second speed for a specific period. The second speed may be constant or, however, may also vary in the second speed range. The regular change from a high to a low speed creates an upwardly directed suction effect, so that the floating of constituents in the liquid and thus a homogeneous distribution can be improved considerably. According to at least one embodiment the mixing cam is driven at a first speed and lowered at specific time intervals to a second speed. A corresponding operation can be accomplished easily.

It is advantageous when the first speed $(v_1)$ is lowered within a period $(t_3-t_2)$ of 50 ms to 500 ms abruptly to the second speed $(v_2)$ and/or the second speed $(v_2)$ is increased within a period $(t_1-t_0)$ of 50 ms to 500 ms abruptly to the first speed $(v_1)$.

Advantageously, the speed of the mixing cam is lowered abruptly, particularly with a deceleration in a range of 2-50 $rps^2$. Owing to the abrupt lowering of the speed of the mixing cam, the floating or mixing of the components is further promoted. It is advantageous when after the abrupt lowering of the speed the speed is then increased also abruptly again, particularly at an acceleration of 2-50 $rps^2$. When corresponding movements take place alternatingly, one obtains a very homogeneous distribution of the solids, particularly in the lower portion of the hopper.

The paddles of the mixing cam may be arranged in the lower portion of the filling hopper, i.e. at least in the lower third.

It is particularly advantageous when the second speed is in a range of 0-50 rpm, and may be zero, i.e. the mixing cam is stopped at the specific intervals and then starts again to finally run again at the first speed in the first speed range. It is also possible that the second speed is reduced not only to zero, but that the rotational direction of the mixing cam is also changed at specific intervals. This means that the mixing cam is stopped and is then brought immediately or after a specific time interval particularly abruptly to a speed, with the rotational direction being opposite to the rotational direction of the first speed.

In at least one example, the first speed is in a range of 70-100% of the maximum speed of the mixing cam, i.e. in an upper range. Specifically, the mixing cam is operated at a speed $v_1$ in a range of 80 to 150 rpm.

The method according to the present disclosure is particularly suited for foodstuffs having an amount of 5% to 50% (vol. %) of chunky inclusions in liquid.

However, the method according to the present disclosure is also suited for foodstuffs that comprise at least two pasty masses that are separately filled into the hopper or are jointly filled into the hopper and run the risk of demixing, as e.g. in the case of liquid emulsions, consisting of oil and water.

The filling machine according to the present disclosure for performing the method comprises a hopper, a conveying mechanism for conveying the foodstuff out of the hopper into a filling unit, e.g. a filling pipe, and a mixing cam with its own drive. The filling machine further comprises a control device which is configured such that at least one speed profile for the drive of the mixing cam is stored or can be stored. The mixing cam is then operated during filling continuously according to the speed profile and thereby ensures a homogeneous distribution of the foodstuff components to be mixed.

It is particularly advantageous when several speed profiles for different foodstuffs are already stored in the control device, so that a matching speed profile can be chosen in a simple manner.

Alternatively, the speed profile may also be adapted manually.

Specifically, the first and/or second speed can be adjusted or adapted. The rotational direction can here also be defined, for instance by way of a positive or negative sign. Specifically, the time interval ($\Delta t_2$) between two speed reductions to the second speed ($v_2$) and/or the time interval between two speed increases to the first speed ($v_1$) and/or the period ($\Delta t_0$) during which the mixing cam is driven at the first speed ($v_1$) and/or the period ($\Delta t_3$) during which the mixing cam is driven or stopped at the second speed ($v_2$) and/or the acceleration or deceleration with which the speed ($v_1$, $v_2$) is increased or lowered can be adjusted.

The mixing cam comprises at least one paddle which is revolvingly circulating in the lower portion of the hopper. When the paddles are arranged in the lower portion, for instance in the lower third, it is ensured that whenever the conveying mechanism, for instance the vane cells of a vane cell pump, receive the foodstuff in the lower portion of the hopper, a homogeneous distribution is given.

Advantageously the time interval between two speed reductions to the second speed ($v_2$) is in a range of 0.5 of 5 s, for example, 0.3 s to 2 s. At correspondingly short time intervals a perfect stirring up can be implemented. The present disclosure shall now be described in more detail hereinafter with reference to the following figures.

DETAILED DESCRIPTION

Figure 1:
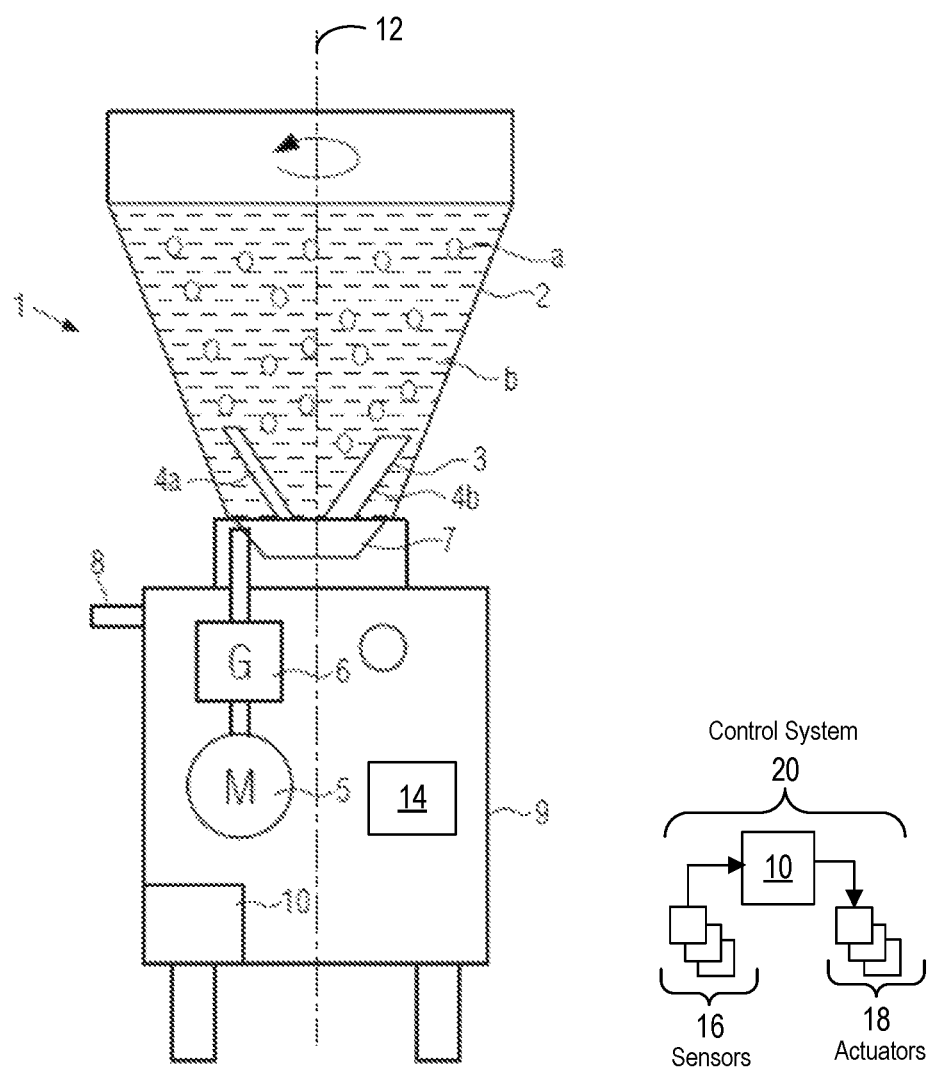
FIG. 1 is a rough schematic view showing a filling machine according to the present disclosure.
Figure 2:
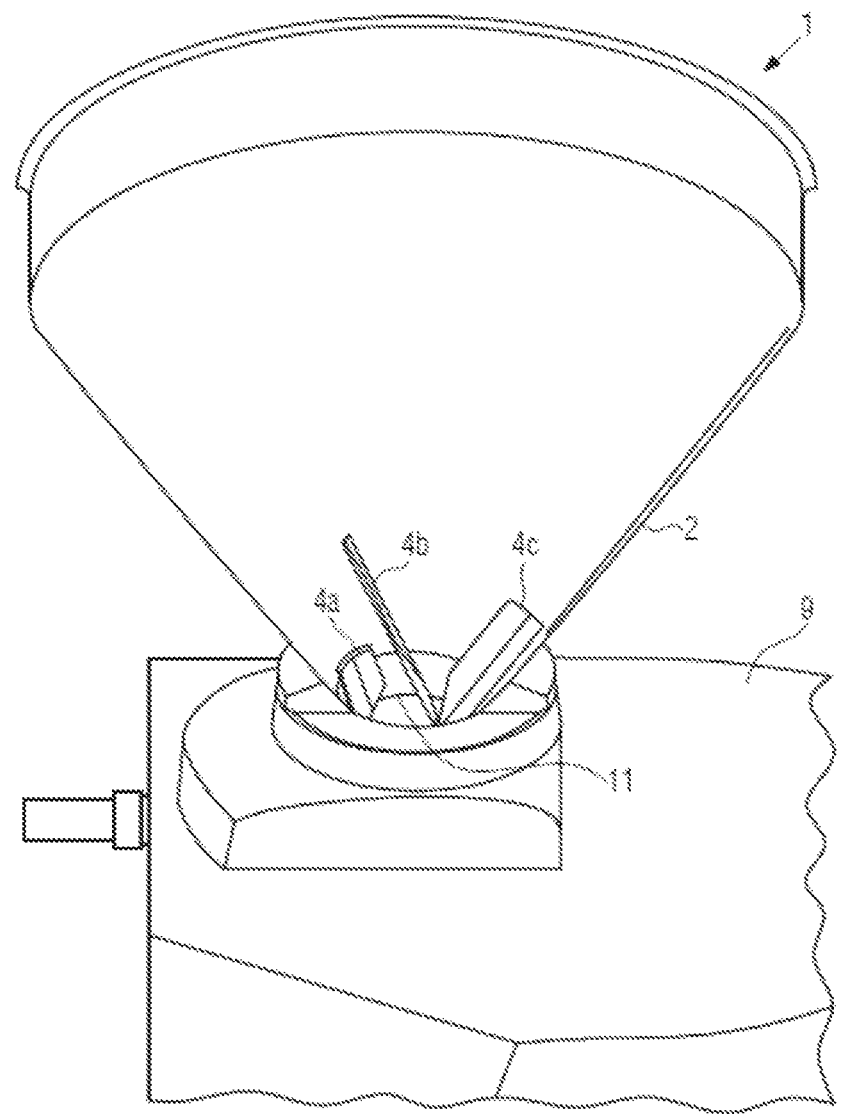
FIG. 2 is a perspective representation showing a partially torn view of a filling machine according to the present disclosure.

FIGS. 1 and 2 show an embodiment of a filling machine according to the present disclosure.

The filling machine 1, for instance a vacuum filling machine, comprises a hopper 2, which at least in sections converges conically downwards.

The lower end of the hopper 2 is followed by a conveying mechanism (not shown) which can transport or press the hopper contents into a filling unit 8, e.g. a filling pipe, to fill a foodstuff, for instance sausage meat, into a sausage casing. The conveying mechanism is for instance a vane cell pump.

According to the present disclosure a foodstuff is filled comprising at least two components to be mixed, for instance a foodstuff which comprises a predetermined proportion of chunky inclusions a in liquid b. The volume fraction of the chunky inclusions in the total foodstuff may be in the range of 5% to 50%. The chunky inclusions may e.g. comprise at least an inclusion of the following group: meat pieces, vegetable pieces, fish cuts, noodles, etc. The liquid may be a liquid, particularly of the following group: liquid aspic, oils, salad dressings, gravies, soups, broths, etc. However, the filling machine and the method are just as well suited for filling at least two differently pasty masses that can demix, e.g. poorly binding emulsions, chili con carne, etc.

The filling machine 1 further comprises a housing 9 in which a drive (not shown) for the conveying mechanism is arranged. A motor 5 and a gear 6 for a mixing cam 3 are also provided in the housing 9. The mixing cam 3 may be arranged in the lower portion of the hopper 2, i.e. in the lower third. The mixing cam 3 is revolvingly driven for instance by way of a bevel gear or a spur gearing. The mixing cam comprises at least one revolving paddle 4. In some examples, the mixing cam comprises a plurality of circulating paddles. The number of the paddles 4, the length of the paddles and the arrangement of the paddles can be made variable.

FIG. 2 shows for instance three paddles 4a, 4b, 4c which are arranged offset relative to one another by 120° and which in this example comprise two sections arranged at an angle relative to one another, so that their cross section is formed to be substantially L-shaped at least in the upper portion. Irrespective of the number and configuration of the paddles, it is advantageous when an outer edge of the paddles slides along the inner wall of the hopper, as is particularly the case in the embodiment shown in FIG. 2 because foodstuffs can thereby be prevented from sticking to the hopper wall. The paddles 4a, 4b, 4c are rotating about the center axis 12 and prompt the contents of the hopper 2 to perform a rotating movement. If the mixing cam 3 did rotate at a constant speed about the center axis 12, this would have the consequence that due to the operative centrifugal forces the solids a are pressed outwards towards the inner wall of the hopper 2, so that no homogeneous distribution of the solids a takes place. According to the present disclosure the mixing cam is therefore operated at varying speeds. A corresponding speed profile can be stored in the control device 10. It is also possible that several speed profiles for different foodstuffs are stored in the control device 10. To this end the filling machine 1 comprises an input device 14 for selecting a specific speed profile. This can for instance be carried out such that the operator chooses a specific speed profile via the input device 14, the parameters of which are displayed via the input device 14, or a specific standard process or a specific foodstuff may be entered into the control device via the input device 14 and the control device 10 may select the corresponding matching speed profile. The control device 10 may then control the mixing cam 3 according to the corresponding matching speed profile. For example, the control device 10 may actuate a motor 5 and/or gear 6 of the mixing cam 3 to operate the mixing cam 3 in accordance with the speeds of the speed profile chosen via the operator, where the operator chooses the speed profile via an input to the input device 14.

In at least one example, the control device 10 may be a part of a control system 20 of the filling machine. For example, the control device 10 may receive an output from sensors 16, and responsive to receiving an output from the sensors 16, the control device 10 may control actuators 18. For example, sensors 16 may be sensors of the input device 14 that detect an operator input to choose a speed profile. Responsive to sensors 16 detecting the operator input (e.g., the sensors detecting a touch screen, mouse, voice command, etc. input), the sensors 16 may send an output to the control device 10. The control device 10, may then control elements of the filling machine such as the mixing cam and/or the conveying device via actuators 18 (e.g., actuators may include motor 5 and/or gear 6 of the mixing cam 3 and/or a motor of a vane cell pump of the conveying device for filling) in accordance with the output received from the sensors 16. Thus, in at least one example, the control device 10 may determine a speed profile chosen by an operator based on an output of sensors 16 and control a mixing cam and/or a conveying mechanism via actuators 18, where the speed profile is chosen by the operator based on an operator input received via sensors 16 of an input device 14.

Alternatively or in addition, it is also possible that the speed profile can be entered or adapted manually, as shall be explained in more detail below.

The filling machine may also comprise a lifting device (not shown) through which the foodstuff can for instance be tilted with a sausage meat carriage into the hopper 2. The foodstuff can also be put into the hopper via one or several feeding pipes.

The method according to the present disclosure shall be explained in more detail hereinafter with reference to FIGS. 1-3 and FIG. 5.

First of all, prior to the beginning of the process a specific speed profile is chosen for the subsequent filling process.

The foodstuff is then filled into the hopper 2 of the filling machine 1. The mixing cam 3 may here already be driven during the feeding of the foodstuff into the hopper so as to prevent demixing.

The mixing cam 3 is driven via its drive 5 according to the selected speed profile.

Figure 3:
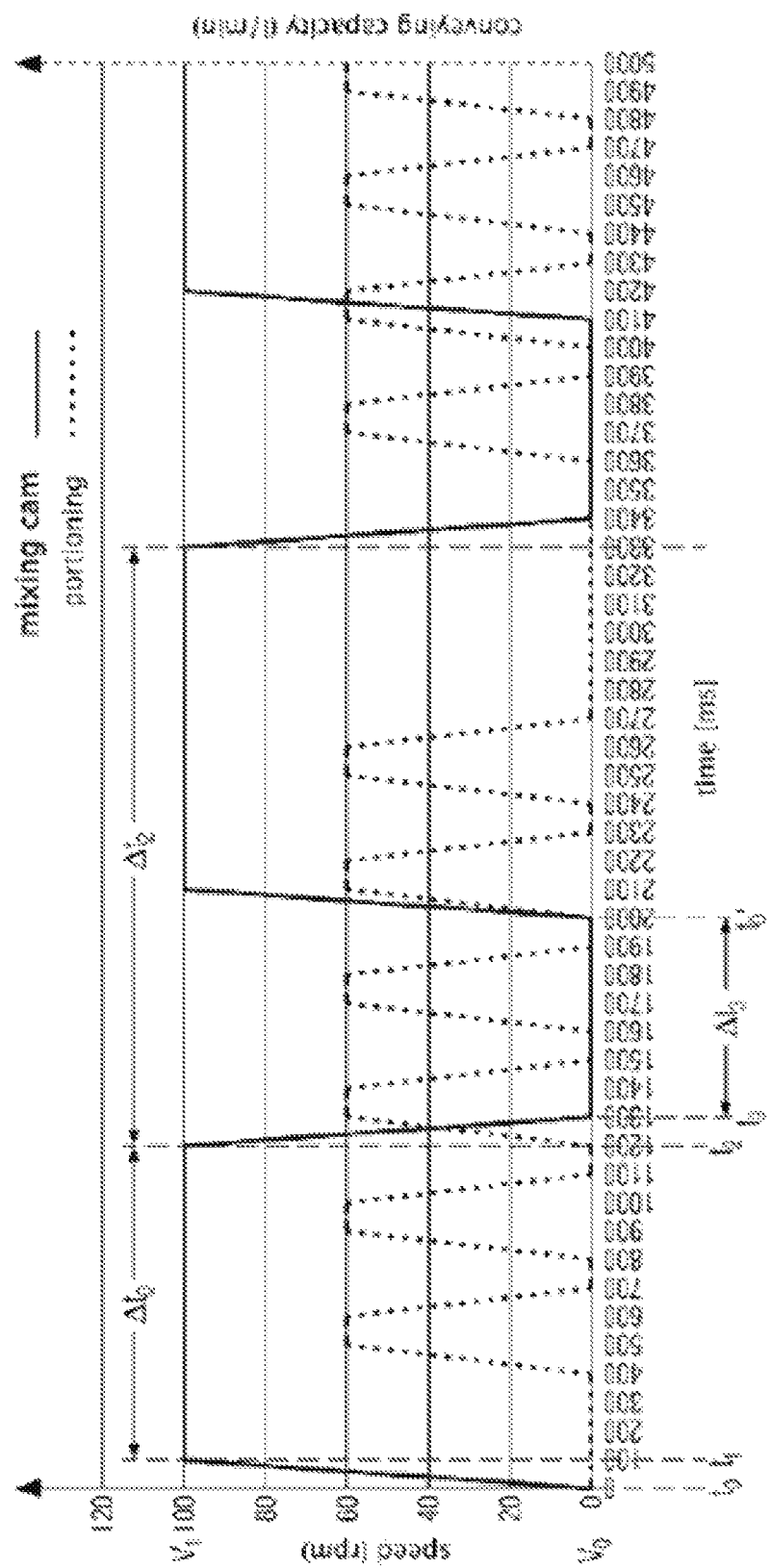
FIG. 3 shows the speed of a mixing cam versus time and the conveying capacity of the conveying capacity versus time.
Figure 4:
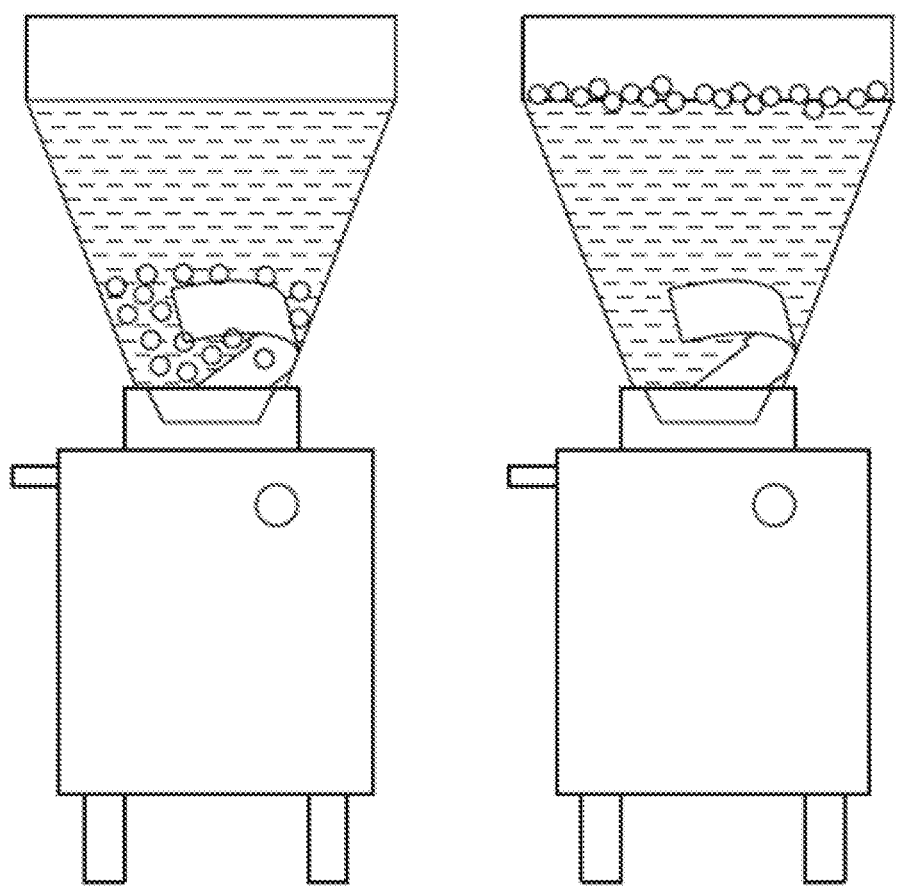
FIG. 4 shows two filling machines according to the prior art.

FIG. 3 shows an example of a corresponding speed profile, wherein the speed of the mixing cam is plotted versus time. At time to the speed is $v_2=0$. The speed is raised at to, independently of the filling operation, to a speed $v_1$, here for instance to 100 rpm, with the speed $v_1$ being reached at a time $t_1$. Here, acceleration takes place abruptly at a rate (slope of the rising edge) of for instance 2-50 rps$^2$, wherein the acceleration period $t_1-t_0$ is in a range of 50-500 ms, particularly here 80 ms to 150 ms, which promotes floating of the inclusions in the liquid. The time period $t_1-t_0$ is for instance also in a range of 50-500 ms, particularly for instance here in a range of 80 ms to 150 ms. The mixing cam is then operated for a time period of $\Delta t_0 = t_2-t_1$, e.g. 0.8 s-1.5 s, at this first speed $v_1$. The speed $v_1$ is here for instance 80-150 rpm. As is shown here, the speed may be constant, but may also vary within the above-mentioned speed range. The mixing cam is decelerated at a time $t_2$, namely to a second speed $v_2$ which is in a second speed range, where $v_2<v_1$, and may be stopped ($v_2=0$). The second speed is reached at a time $t_3$. The second speed range is for instance in a range of 0 to 50 rpm, wherein the second speed may here also be constant, or may, however, vary within the previously mentioned range. Here, the speed is also lowered abruptly, i.e. with a deceleration (slope of the falling edge) of for instance 2-50 rps$^2$, wherein for instance $t_3-t_2$ may be 50 ms to 500 ms. As has already been explained, the abrupt speed change improves the floating of the solids particularly in the lower portion of the hopper. The speed is then run for instance for a time period $\Delta t_3 = t_0-t_3$ at the speed $v_2$ or is however stopped. The first cycle ends here. A corresponding cycle can be repeated continuously. The duration $\Delta t_2$ from the beginning of a falling speed edge to the beginning of the falling speed edge of a subsequent cycle is about 0.5 s to 5 s.

Owing to the rapid sequence of the abruptly changing speeds it can be ensured that an adequate thorough mixing is also ensured at increased solids contents. While the mixing cam is operated with the specific speed profile, the conveying mechanism is running at the same time and conveys the foodstuff from the lower portion of the funnel into the filling unit 8. The dotted line represents the portion output as a function of time. As can be seen in FIG. 3, the conveying mechanism is running in portions, i.e. intermittently, with a respective portion, i.e. a predetermined amount, being ejected out of the filling unit and the conveying mechanism being then at a standstill. During this standstill period, a sausage casing can for instance be twisted off. This is however only one example of a filling process. A filling operation can also be performed continuously. FIG. 3, however, illustrates that the speed profile, i.e. the speed as a function of time, with which the mixing cam 3 is driven is independent of the speed profile of the conveying mechanism.

Hence, this means that the mixing cam 3 is here driven continuously at a first speed $v_1$ in a first speed range and the speed $v_1$ is reduced at intervals $\Delta t_2$ to a second speed $v_2$ in a second speed range, where $v_2<v_1$ and may be $v_2=0$. It is however also possible that the rotational direction of the mixing cam changes at specific intervals. This means that the mixing cam is first stopped and then rotates in the opposite direction to be finally stopped again to rotate in the first direction again.

It is also possible that the speed profile can be adapted manually, wherein particularly the first and/or second speed $v_1$ or $v_2$ and the speed ranges, respectively, can be adapted. It is also possible that the time interval $\Delta t_2$ can be adjusted and/or the time periods $\Delta t_0$ and/or $\Delta t_3$ and the corresponding parameters $t_0$, $t_1$, $t_2$, $t_3$, respectively. This means that acceleration or deceleration is also adjustable. The possibility of making adjustments or readjustments is particularly advantageous for the reason that a correction is possible when an operator notices that the mixture is not adequate. Then the time period $\Delta t_2$ can for instance be shortened or, however, acceleration or deceleration of the mixing cam can also be adapted accordingly when the speed is raised or lowered. When the mixing cam 3 is used, a counter arm can be dispensed with. It is however also possible that the stream in the hopper is influenced via a standing paddle, which is e.g. fixed to or held on the hopper columns or on the hopper.

Figure 5:
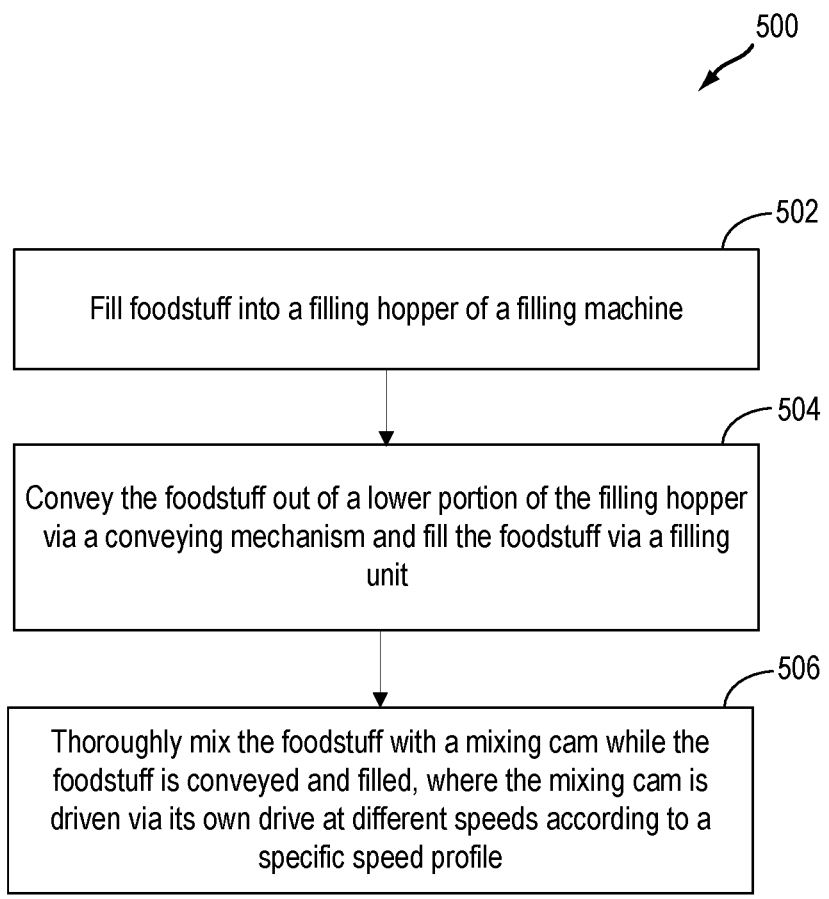
FIG. 5 shows a flow chart of an example method according to at least one example of the present disclosure.

Turning now to FIG. 5, FIG. 5 shows a flow chart of an example method 500 according to at least one example of the present disclosure. Method 500 may be a method for filling foodstuff, where the foodstuff comprises at least two components to be mixed.

Method 500 may begin at step 502, by filling foodstuff into a filling hopper of a filling machine. Following step 502, method 500 may include conveying the foodstuff out of a lower portion of the filling hopper via a conveying mechanism and filling the foodstuff via a filling unit. At step 506 of method 500, the method may include thoroughly mixing the foodstuff with a mixing cam while the foodstuff is conveyed and filled, where the mixing cam is driven via its own drive at difference according to a specific speed profile.

In at least one example, the method 500 for filling the foodstuff which comprises at least two components to be mixed may be for sausage production. Further, in some examples, the specific speed profile of the mixing cam may be independent of a speed profile of the conveying mechanism.

In at least one example, method 500 may include driving the mixing cam continuously at a first speed in a first speed range and the first speed is reduced at intervals to a second speed in a second speed range, wherein the first and/or the second speed is either constant or respectively varies in the first or the second speed range. Additionally or alternatively, the first speed may be abruptly lowered to the second speed within a period of 50 ms to 500 ms and/or the second speed is abruptly increased to the first speed within a period of 50 ms to 500 ms.

In at least one example, the second speed may be in a range of 0-50 rpm in method 500, and/or the first speed may be in a range of 70-100% of the maximum speed of the mixing cam, for example in a range of 80 to 150 rpm. In at least one example, the second speed may be 0 rpm in method 500.

In some examples, the parameters of the specific speed profile in method 500 may be changed based on the foodstuff. For example, one or more of the first and/or the second speed ($v_1$, $v_2$), and/or the time interval ($\Delta t_2$) between two speed reductions to the second speed ($v_2$), and/or the time interval between two speed increases to the first speed ($v_1$), and/or the time period ($\Delta t_0$) in which the mixing cam is driven at the first speed ($v_1$), and/or the time period ($\Delta t_3$) in which the mixing cam is driven at the second speed ($v_2$) or stopped, and/or the acceleration or deceleration with which the speed ($v_1$, $v_2$) is increased or lowered may be adjusted.

Additionally or alternatively, method 500 may include wherein a rotational direction of the mixing cam is changed at specific intervals. Furthermore, in at least one embodiment, method 500 may include wherein a first speed of the mixing cam is abruptly lowered and/or a second speed of the mixing cam is abruptly increased. In such examples, abruptly lowering the first speed of the mixing cam may include lowering the first speed with a deceleration in a range of 2-50 $rps^2$. Additionally or alternatively, abruptly increasing the second speed of the mixing cam may include increasing the second speed with an acceleration of 2-50 $rps^2$.

In at least one example, the foodstuff of method 500 may comprise 5% to 50% of chunky inclusions in a liquid. For example, the foodstuff in method 500 may comprise at least two pasty masses.

It is noted that in at least one example, the methods and routines disclosed herein, including method 500, may be stored as executable instructions in non-transitory memory of a control device (e.g., control device 10) and may be carried out by a control system (e.g., control system 20).

The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description.

One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various hardware components in combination with the electronic controller.

The invention claimed is:

1. A method for filling a foodstuff which comprises at least two components to be mixed, comprising:
   filling the foodstuff into a filling hopper of a filling machine, wherein the hopper converges at least in sections conically downwards, and thoroughly mixing the foodstuff with a mixing cam, wherein the mixing cam comprises at least one paddle revolving circulating in a lower portion of the hopper,
   wherein the mixing cam is driven via its own drive at different speeds according to a specific speed profile while the foodstuff is conveyed out of a lower portion of the filling hopper via a conveying mechanism and is filled via a filling unit, and
   wherein a first speed of the mixing cam is abruptly lowered and/or a second speed of the mixing cam is abruptly increased.

2. The method according to claim 1, wherein the method for filling the foodstuff which comprises at least two components to be mixed is for sausage production.

3. The method according to claim 1, wherein the specific speed profile of the mixing cam is independent of a speed profile of the conveying mechanism.

4. The method according to claim 1, wherein the mixing cam is driven continuously at a first speed in a first speed range and the first speed is reduced at intervals to a second speed in a second speed range, and wherein the first and/or the second speed is either constant or respectively varies in the first or the second speed range.

5. The method according to claim 4, wherein
   the first speed is abruptly lowered to the second speed within a period of 50 ms to 500 ms and/or the second speed is abruptly increased to the first speed within a period of 50 ms to 500 ms.

6. The method according to claim 4, wherein the second speed is in a range of 0-50 rpm, and/or
   the first speed is in a range of 70-100% of the maximum speed of the mixing cam, particularly in a range of 80 to 150 rpm.

7. The method according to claim 6, wherein the second speed is 0 rpm.

8. The method according to claim 1, wherein parameters of the specific speed profile are changed based on the foodstuff.

9. The method according to claim 8, wherein
   the first and/or the second speed ($v_1$, $v_2$), and/or
   a time interval ($\Delta t_2$) between two speed reductions to the second speed ($v_2$) and/or a time interval between two speed increases to the first speed ($v_1$) and/or a time period ($\Delta t_0$) in which the mixing cam is driven at the first speed ($v_1$) and/or a time period ($\Delta t_3$) in which the mixing cam is driven at the second speed ($v_2$) or stopped and/or an acceleration or a deceleration with which the speed ($v_1$, $v_2$) is increased or lowered are adjusted.

10. The method according to claim 1, wherein a rotational direction of the mixing cam is changed at specific intervals.

11. The method according to claim 1, wherein abruptly lowering the first speed of the mixing cam includes lowering the first speed with a deceleration in a range of 2-50 $rps^2$.

12. The method according to claim 1, wherein abruptly increasing the second speed of the mixing cam includes increasing the second speed with an acceleration of 2-50 $rps^2$.

13. The method according to claim 1, wherein the foodstuff comprises 5% to 50% of chunky inclusions in a liquid.

14. The method according to claim 1, wherein the foodstuff comprises at least two pasty masses.

15. The method according to claim 1, wherein a time interval between two abrupt speed reductions is in a range of 0.5 s to 5 s.

* * * * *